United States Patent [19]

Higuchi et al.

[11] Patent Number: 4,666,219

[45] Date of Patent: May 19, 1987

[54] DISPLAY UNIT WITH TILT MECHANISM

[75] Inventors: Akio Higuchi; Hitoshi Someya, both of Tokyo, Japan

[73] Assignee: Oki Electric Industry, Ltd., Tokyo, Japan

[21] Appl. No.: 726,389

[22] Filed: Apr. 23, 1985

[30] Foreign Application Priority Data

Apr. 27, 1984 [JP] Japan .................................. 59-61443

[51] Int. Cl.$^4$ ............................................. A47B 81/06
[52] U.S. Cl. ...................................... 312/7.2; 108/1; 248/138; 248/346; 312/327; 358/254
[58] Field of Search ...................... 312/7.2, 231, 327; 248/133, 138, 143, 346; 108/1, 4, 8; 358/254; 297/261, 258, 272, 132; 248/1 A, 1 B, 1 C, 1 E, 1 F, 1 H, 1 I, 1 J

[56] References Cited

U.S. PATENT DOCUMENTS

| | | | |
|---|---|---|---|
| 441,792 | 12/1890 | Eyles | 108/8 |
| 2,893,674 | 7/1959 | Monaco | 248/1 F |
| 2,922,609 | 1/1960 | Collier | 248/1 F |
| 3,970,792 | 7/1976 | Benham et al. | 248/1 F |
| 4,068,961 | 1/1978 | Ebner et al. | 403/55 |
| 4,368,867 | 1/1983 | Pendleton et al. | 248/1 I |
| 4,372,515 | 2/1983 | Noonan | 248/1 I |
| 4,410,159 | 10/1983 | McVicker et al. | 248/349 |
| 4,415,136 | 11/1983 | Knoll | 248/1 F |
| 4,483,503 | 11/1984 | Gahan | 248/1 F |
| 4,533,105 | 8/1985 | Cornwell, Jr. et al. | 248/1 I |

FOREIGN PATENT DOCUMENTS

| | | | |
|---|---|---|---|
| A41804 | 12/1981 | European Pat. Off. | 248/1 F |
| 3301467 | 7/1984 | Fed. Rep. of Germany | 108/1 |

OTHER PUBLICATIONS

IBM Technical Disclosure Bulletin, Lowrie et al., Adjustable Tilt Mechanism for Data Entry Terminal, 6/1981, vol. 24, No. 1A.

Primary Examiner—Kenneth J. Dorner
Assistant Examiner—Thomas A. Rendos
Attorney, Agent, or Firm—Wenderoth, Lind & Ponack

[57] ABSTRACT

A display unit has a body including a display screen, and a tilt mechanism including a support mounted on the bottom of the body and composed of two partly cylindrical continuous outer surfaces having spaced center axes of curvature, and a base having a plurality of projections on which the outer surfaces are slidably disposed. When the display unit is tilted to change the angle of the display screen with respect to the vertical direction, any point on the display screen is moved back and forth only for a small distance because the center axes of curvature are moved with turning movement of the outer surfaces.

5 Claims, 5 Drawing Figures

DISPLAY UNIT WITH TILT MECHANISM

BACKGROUND OF THE INVENTION

1. Field of the invention:

The present invention relates to a display unit having a tilt mechanism for varying the angle of a display screen with respect to the vertical direction.

2. Description of the Prior Art:

FIG. 2 of the accompanying drawings illustrates a tilt mechanism in a conventional display unit. The display unit has a body 1 including a lower support 2 having a partly cylindrical or arcuate outer surface of a radius of curvature $r_1$ and angularly movable about a central point $O_1$. The support 2 is swingably supported by projections 4 on a base 3. When the angle of a display screen 5 of the display unit is to be varied with respect to the vertical direction, a front outer casing of the display unit is vertically moved to cause the arcuate surface of the support 2 to slide on the projections 4. At this time, the display screen 5 is moved an interval $a_1$ in the back-and-forth direction while following the path through points $P_1$, $P_2$, $P_3$.

With the conventional display unit, however, the display screen is moved back and forth to a large extent each time its angle is varied. When the angle of the display screen is changed, therefore, the distance of the visual point of the user and the display screen is also changed to thereby cause the display screen to be seen differently by the user. This requires the user to change the attitude or move the chair or desk so that the user can see the display screen clearly and comfortably. The user is, however, subjected to an extra burden and increased fatigue in changing the attitude or moving the chair or desk. If the user does not take any action to improve visibility, then the user has to see a display screen which is visually different from the previous display screen. It takes a long time for the user to become accustomed to such a visually different display screen, or the user tends to fatigue because of reduced comfort which the user has in seeing the display screen.

For reducing the movement of the display screen 5 in the back-and-forth direction, it would be possible to employ a support 6, shown by the dotted line, having an arcuate surface of a radius $r_1'$ of curvature and angularly movable about a central point $O_1'$, the radius $r_1'$ being longer than radius $r_1$. However, the user would be required to move the support 6 for a greater interval on the projections 4 because of the larger radius when the angle of the display screen 5 is adjusted. Another problem with the proposed solution is that the curvature of the arcuate surface of the support 6 would be reduced due to the reduced radius, resulting in difficulty in turning the support 6.

U.S. Pat. No. 4,068,961 issued on Jan. 17, 1978 discloses a swivel joint which allows an object to be provided with limited and controlled movement in two orthogonal directions.

SUMMARY OF THE INVENTION

In view of the drawbacks with the conventional tilt mechanism, it is an object of the present invention to provide a display unit having a tilt mechanism for varying the angle of the display screen with respect to the vertical direction while reducing back-and-forth movement of the display screen, thus allowing the user to use the display unit more efficiently and effectively.

To achieve the above object, a tilt mechanism of a display unit according to the present invention has a support mounted on the bottom of a display unit body and composed of two partly cylindrical or arcuate continuous outer surfaces having spaced centers of curvature, the display unit body being mounted swingably on projections on a base.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
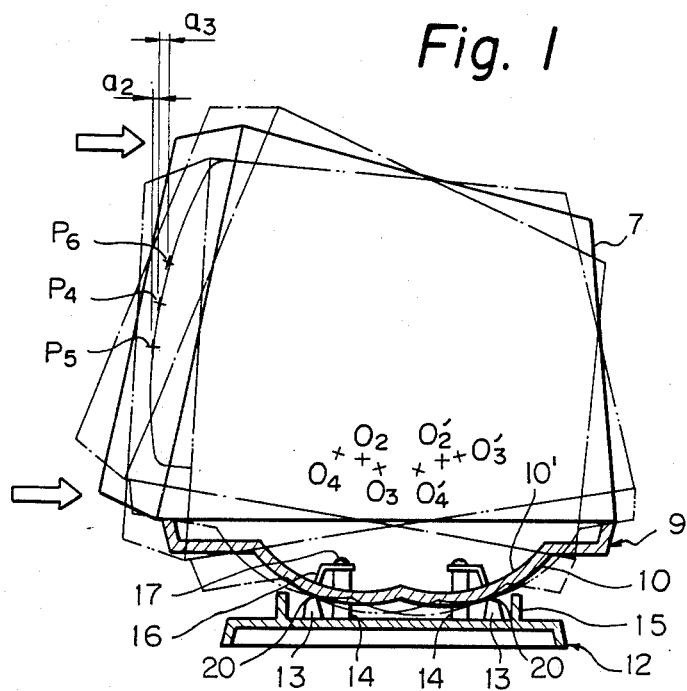
FIG. 1 is a sectional side elevational view of a display unit according to the present invention.
Figure 2:
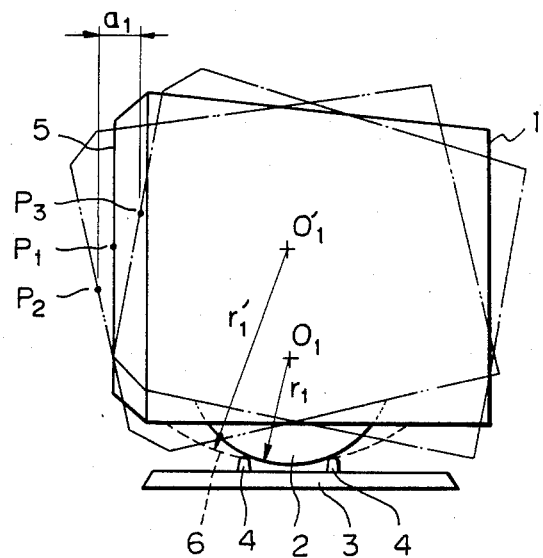
FIG. 2 is a side elevational view of a conventional display unit.
Figure 3:
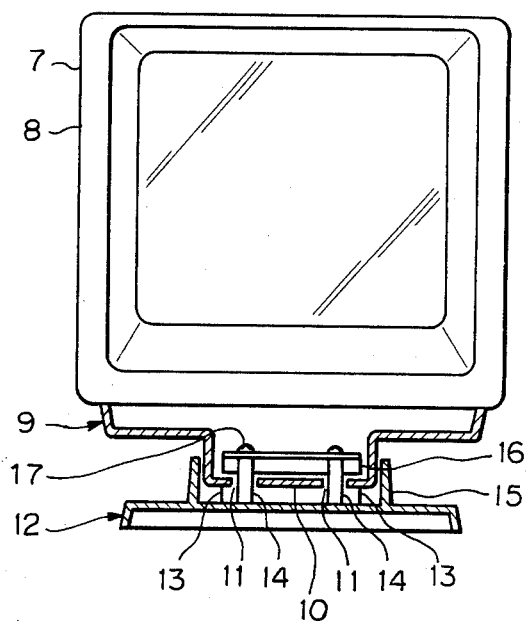
FIG. 3 is a sectional front elevational view of the display unit of the present invention.
Figure 5:
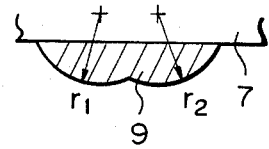
FIG. 5 is a side elevational view of a support of the display unit.

As shown in FIGS. 1 and 3, a display unit according to the present invention has a body 7 including a display screen 8. A tilt mechanism of the display unit comprises a uniform thickness curved plate-shaped support 9 mounted on the bottom of the body 7 and comprising two partly cylindrical or arcuate continuous outer surfaces 10 having spaced centers of curvature or turning movement. The outer surfaces 10 have radii $r_1$, $r_2$ of curvature as shown in FIG. 5. The outer surfaces 10 have slots 11 defined in laterally spaced portions thereof. The support 9 is placed on a base 12 having spaced projections 13 supporting front and rear portions of the outer surfaces 10. As is illustrated in FIG. 1, the projections 13 have apexes 20 of small surface area at their tips for contacting the outer surfaces 10. Bosses 14 mounted on the base 12 project through the slots 11. The projections 13 and the bosses 14 are surrounded by an outer cover 15 mounted on the base 12. Pressers 16 having an angular cross section are fastened by screws 17 to the upper ends of the bosses 14 and have distal edges for holding down the support 9 against the projections 13 by contacting the two partly cylindrical or arcuate continous inner surfaces 10' having the same radii $r_1$, $r_2$ of curvature as the outer surfaces 10.

Operation of the tilt mechanism will be described. When the display screen 8 is to be angularly moved from the solid-line position of FIG. 1 to the two-dot-and-dash-line position, the front lower portion of the body 7 is depressed to cause the outer surfaces 10 of the support 9 to slide on the projections 13 on the base 12.

Since the support 9 is held down by the pressers 16 against movement away from the base 12, the centers $O_2$, $O_2'$ of curvature (center axes of curvature spaced apart in a direction rearward of the screen perpendicular to the length and width thereof, and extending parallel to the width of the screen) during turning movement of the support 9 are displaced rearwardly to positions $O_3$, $O_3'$, respectively. Therefore, even if a point $P_4$ on the display screen 8 is moved to a front point $P_5$, the interval $a_2$ of back-and-forth movement of the display screen 8 is small since the centers $O_2$, $O_2'$ are displaced rearwardly.

For moving the display screen 8 from the solid-line position to the dot-and-dash-line position, the front upper portion of the body 7 is raised to cause the outer surfaces 10 of the support 9 to slide on the projections 13 on the base 12.

Since the support 9 is held down by the pressers 16 against movement away from the base 12, the centers $O_2$, $O_2'$ of curvature or turning movement of the support 9 are displaced forwardly to positions $O_4$, $O_4'$ respectively. Therefore, even if the point $P_4$ on the display screen 8 is moved to a rear point $P_6$, the interval $a_3$ of back-and-forth movement of the display screen 8 is small since the centers $O_2$, $O_2'$ are displaced forwardly.

Figure 4:
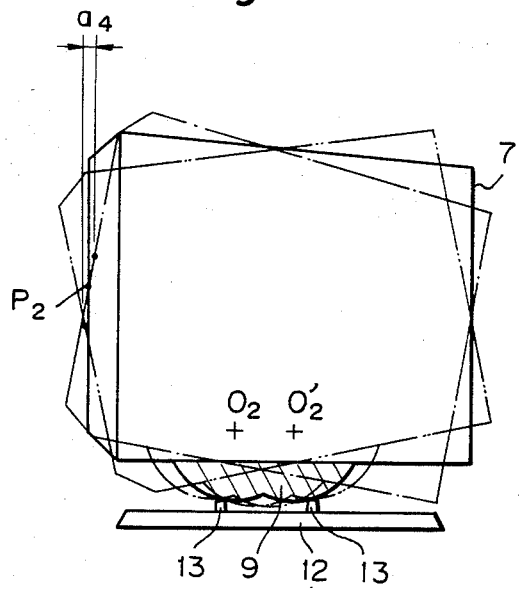
FIG. 4 is a side elevational view of the display unit of the present invention.

When the display screen 8 is tilted between the angularly spaced two-dot-and-dash-line positions, as shown in FIG. 4, a point $P_2$ on the display screen 8 is displaced back and forth for a small interval $a_4$.

While in the illustrated embodiment the projections 13 are disposed on the upper surface of the base 12 in front and rear positions, the projections 13 may be disposed on the upper surface of the base 12 in four positions corresponding to the four corners of the outer surfaces 10 of the support 9, or may be continuously disposed provided they will not interfere with the turning movement of the support 9.

With the arrangement of the present invention, the centers of turning movement of the two arcuate outer surfaces of the support are moved back and forth for a reduced interval as the display unit body is angularly moved to change the angle of the display screen with respect to the vertical direction. Therefore, the distance between the display screen and the user's eyes is varied only a small distance to thereby reduce the fatigue of the user during use of the display unit. Thus, the user is not required to make adjustments resulting from the angular adjustment of the display screen, i.e., the user is not required or change the attitude or move his chair or desk for better visibility.

Although a certain preferred embodiment has been shown and described, it should be understood that many changes and modifications may be made therein without departing from the scope of the appended claims.

What is claimed is:

1. A display unit, comprising:
    a body including a display screen having a length and a width;
    a tilt mechanism including a support mounted on a bottom of said body, said support including first and second continuous outer surfaces, each in the shape of a segment of a cylinder, and having respective parallel center axes of curvature extending in the direction of said width and spaced apart in a direction perpendicular to said length and said width;
    a base having a plurality of projections extending in the direction of said length including a first projection terminating at a first apex and a second projection terminating at a second apex spaced from said first apex in said direction perpendicular to said length and said width, said first and second outer surfaces being disposed on said plurality of projections for sliding movement perpendicularly to said direction of said width with said first outer surface being slidably disposed on said first apex and said second outer surface being slidably disposed on said second apex; and
    means for simultaneously holding said first outer surface in sliding contact with said first apex and said second outer surface in sliding contact with said second apex when said first and second outer surfaces are slidably moved perpendicularly to said direction of said width, whereby said center axes move generally in said direction perpendicular to said length and said width when said first and second outer surfaces are slidably moved perpendicularly to said direction of said width.

2. A display unit according to claim 1, wherein said support has first and second continuous inner surfaces respectively opposite said first and second outer surfaces, said support having slots defined therein, said slots being spaced apart in said direction of said width, said display unit further comprising bosses mounted on said base and projecting respectively through said slots, and pressers mounted on ends of bosses contacting said first and second inner surfaces so as to hold said first and second outer surfaces against said plurality of projections.

3. A display unit according to claim 2, including an outer cover mounted on said base in surrounding relation to said plurality of projections and said bosses.

4. A display unit according to claim 1, wherein said length extends vertically, said width extends horizontally, and said first and said center axes are located below a midpoint of the length of said screen.

5. A display unit as in claim 1, wherein said first and second continuous outer surfaces are contiguous to each other.

* * * * *